United States Patent [19]

Sumira

[11] 4,226,758

[45] Oct. 7, 1980

[54] FRICTION MATERIAL

[75] Inventor: Arthur Sumira, Manchester, England

[73] Assignee: Gandy Frictions Limited, Merseyside, England

[21] Appl. No.: 880,811

[22] Filed: Feb. 23, 1978

[30] Foreign Application Priority Data

Feb. 23, 1977 [GB] United Kingdom ............... 7563/77

[51] Int. Cl.$^2$ .............................................. C08K 7/26
[52] U.S. Cl. ................................................... 260/38
[58] Field of Search ........................ 260/38, DIG. 39

[56] References Cited

U.S. PATENT DOCUMENTS

| | | | |
|---|---|---|---|
| 2,877,198 | 3/1959 | Morrissey | 260/DIG. 39 |
| 3,450,236 | 6/1969 | Nadasan et al. | 260/38 X |
| 3,891,595 | 6/1975 | Birchall | 260/38 |
| 3,896,075 | 7/1975 | Longley | 260/DIG. 39 |
| 4,127,556 | 11/1978 | Ushitani et al. | 260/38 |

FOREIGN PATENT DOCUMENTS 2738490  3/1979  Fed. Rep. of Germany ............ 260/38

*Primary Examiner*—Sandra M. Person
*Attorney, Agent, or Firm*—Peter L. Berger

[57] ABSTRACT

An improved friction material for brakes and clutches, in which asbestos is partly or completely replaced by an artificial mineral fibre, in particular a blown aluminosilicate fibre made from the mineral kaolin.

3 Claims, No Drawings

FRICTION MATERIAL

This invention relates to friction materials for use as linings in brakes, and clutches, automotive or industrial disc brakes in particular.

Conventional friction materials such as disc brake pads or drum brake linings are compositions which are made of mineral fibre such as asbestos, various fillers, for example barytes, rottenstone, whiting, and often with the inclusion of metal particles such as brass, copper, iron dust, together with a binder to hold all ingredients firmly together as a homogeneous composition. The binder is usually a phenol-formaldehyde resin. It can be a resin of the resol type, a novolac or even in a modified version, for instance, oil- cashew- rubber- or inorganic modified, all being types of resin well known to those skilled in the art. Rubber can be also used as a binder, for instance, NR, NBR, SBR, neoprene, or combinations of rubber and phenolic resin. All such resins and rubbers will be referred to hereinafter as binder resin.

The mixture containing asbestos, fillers and the binder resin, henceforth called the mix, is subjected to heat and pressure in a suitable die or mould to shape it to the form as desired. Under heat, the pressure, the resin sets, that is cross-linking reaction of the resin takes place with the result that all particles of the mix are firmly bound together.

The final result is a solid block or pad of a shape determined by the die or mould. The block or pad is then post-cured in a heated oven to harden the resin still further and to remove all remaining traces of volatiles in the compound.

Finally, the moulded block is machined or ground to the dimensions to make it fit e.g. into a disc brake caliper or drum brake shoe.

Disc brake pads are usually moulded directly onto a steel support or carrier called a pressure plate or back plate, the plate being installed in direct contact with the piston of the caliper. Brake blocks in the form of linings are either drilled and then riveted onto the brake shoe, or bonded onto the brake shoe.

Chrysotile asbestos is the most common fibre used in the manufacture of friction materials in general. It is a mineral occurring in veins traversing serpentine rock in the form of fine, silky, flexible fibrous crystals. It contains approximately 30%–40% $SiO_2$, 38%–43% MgO, 12%–14% $H_2O$ and traces of iron oxides. Chrysotile asbestos occurs in various lengths of fibre. The long asbestos fibre is used for spinning and making asbestos cloth which, when impregnated with a binder resin solution, produces a woven type of friction material. The shorter grades of asbestos are invariably used for direct mixing with fillers and binder resins, to form dry or wet mixes. In the latter case, the binder resin is used in the form of a phenolic resin, rubber or rubber and resin solution. Chrysotile asbestos is relatively soft, its hardness in the Mohs scale being about 3. It has good tensile strength but suffers when it is subjected to high temperatures of 500° C. and above, under which conditions structural internal changes accompanied by the loss of water of crystalisation begin to affect adversely its strength.

Asbestos, in particular its very fine fibrous particles in the form of dust, is known to constitute a health hazard and, for this reason, it has to be handled with great care. Therefore, a fibre which is less injurious to health in friction materials is of great industrial advantage.

According to the present invention, in a friction material, all or part of asbestos fibre is replaced by an artificial mineral fibre of the ceramic or similar type. All other ingredients, fillers, binder resins can remain the same and be incorporated in the mix in the same manner as with asbestos.

Preferably no asbestos is used at all, but in some cases a small amount of it is employed only. Thus, asbestos is wholly or largely replaced by an artificial mineral fibre such as rockwool, slagwool, or preferably a fibre of the ceramic type as exemplified and sold under the trade name "Kaowool" (Registered Trade Mark) by Morganite Ceramics Ltd. of Neston, Cheshire, and "Saffril" (Registered Trade Mark) made by I.C.I.

"Kaowool" is a blown alumino-silicate fibre made from the mineral kaolin, otherwise known as china clay. Kaoline is very widespread in its occurrence, and its finer, purer grades gained prominence in the manufacture of ceramics. Its chemical composition expressed in terms of oxides comprises 43%–47% alumina ($Al_2O_3$), 50%–54% silica ($SiO_2$) and small quantities of other accompanying oxides such as iron, titanium, calcium, sodium, etc.

The blown fibre is light in weight, white in colour, and highly flexible, and in this respect it resembles cotton. However, unlike cotton, it is resistant to most chemicals and, most significant of all, "Kaowool" has a very low heat transfer coefficient and a very high temperature reistance up to 1200° C. without any signs of degradation.

Kaowool fibre is available in various forms and lengths, graded according to its fibre length which can be as long as 10 cm. The grade called Bulk A consists of the long fibre while the grade Bulk B is a chopped form, graded according to its length, examples being 3 mm, 6 mm, 10 mm, to suit particular applications. The fibre diameter is in the region of 2.5 to 3 microns.

As the artificial mineral fibre is produced in various forms and lengths, short and long for instance, any form can be used, though the long and bulky grades are preferable. It is also available in the form of strips and pressed sheets of varying thicknesses suitable for impregnation with binder resin solutions.

Another artificial mineral fibre is Rockwool made by the Rockwool Group of Companies of Hedenhusene Rockwool, Denmark. It is made from the stone diabase and contains 13% alumina, 47.5% silica, 16% calcium oxide, 10% magnesia and small quantities of other oxides e.g. iron, manganese, sodium oxides.

Both fibres, "Kaowool" and Rockwool, have in common alumina. The difference between asbestos and "Kaowool" or Rockwool is that asbestos being a typical magnesium silicate, does not have any alumina. Both "Kaowool" and rockwool are artificial products obtained by high temperature transformation and are thus true artificial mineral fibres, in contrast to asbestos which is a natural product. Though all these fibres are in the same density range of 2.3–2.7 g/cc, "Kaowool" and Rockwool differ in their hardness which in Mohs scale is 6 against that of asbestos viz. 3 to 4. "Kaowool" and Rockwool can be mixed and handled in the same way as asbestos, but do not constitute a known health hazard.

"Kaowool", in particular the bulk fibre grade, has to be opened up, before use, by a blow-out disintegrator or any other similar appliance. The purpose of opening up the fibre is to increase its bulk volume and by doing so, to facilitate the penetration of fillers, binder resins and all other ingredients into the fibre during the mixing operation.

Friction materials based on "Kaowool" ceramic fibre display a much more stable coefficient of friction over a wide temperature range than those made with asbestos only. Disc brake pads made with "Kaowool" are particularly well suited for high performance motor vehicles, displaying an excellent resistance to fade and an enhanced positive response to the braking effort. Furthermore, they seem to dissipate the heat during heavy braking much more effectively than asbestos-based materials.

The amount of "Kaowool" used can vary from 5% by weight to as much as 70% by weight. It can also be used in mixtures with other fibres (including asbestos) in amounts as low as 0.5% by weight.

"Kaowool" fibre will mix in the same way as asbestos. This means that all other ingredients of the friction material such as mineral fillers, phenolic resins, metal particles in the form of swarf, dust or powder can be introduced and mixed together into a homogeneous mix, generally as set forth above in relation to known asbestoscontaining compositions. A "Kaowool"-containing composition in general terms can contain:

Phenolic resin: 8%–25% by weight
"Kaowool" fibre: 5%–70% by weight
Mineral Fillers: 10%–40% by weight
Metallic fillers: 10%–40% by weight
High temperature lubricants: 1%–15% by weight High temperature lubricants include metal sulphides such as molybdenum disulphide and antimony trisulphide, and also graphite.

It seems that, in general, a low proportion of "Kaowool", e.g. 5% to 20%, gives the lowest rate of wear but the relation between the coefficient of friction and the proportion of "Kaowool" is not simple and depends on the other constituents of the composition.

Friction materials based on "Kaowool" are in general formulated and made in the same way as those using asbestos fibre, as illustrated by the following examples:

EXAMPLE 1

A formulation suitable for disc brake pads of high performance is made as follows:

Phenol-formaldehyde Novolac: 12% by weight
"Kaowool" in bulk form: 35% by weight
Fine copper powder: 17.5% by weight
Barytes: 20% by weight
Graphite: 3% by weight
Lead powder: 5% by weight
Lead powder: 5% by weight
Antimony trisulphide: 7.5% by weight The "Kaowool" fibre is opened up in a suitable disintegrator and then mixed with the other ingredients in conventional mixing equipment such as, for instance; Lödige-Morton high speed mixer. The "Kaowool" is mixed with the resin for 1-2 minutes first, followed by the addition of the rest of the ingredients for another 2-5 minutes. The resulting mix does not differ visually much from an ordinary asbestos mix.

The pressing into disc brake pads is carried out as known to those skilled in the art, at temperatures between 140°–175° C. and pressures ranging from 150°–450° kg. per cm$^2$ for 5-15 minutes or longer, depending on the type of phenolic resin employed. When tested on the scale friction dynamometer, the following results have been obtained.

|        | Average coefficient of friction | Loss in Thickness |
|--------|---------------------------------|-------------------|
| Test 1 | .43                             | 0.25 mm.          |
| Test 2 | .45                             | 0.25 mm.          |

Even a small amount of "Kaowool" can have a beneficial effect on the all-round performance as the following example illustrates:

EXAMPLE 2

|                             | A    | B    | C    |             |
|-----------------------------|------|------|------|-------------|
| "Kaowool"                   | 5    | —    | —    | % by weight |
| Asbestos                    | —    | 5    | —    | "           |
| Rockwool                    | —    | —    | 5    | "           |
| Phenol-Novolac              | 15   | 15   | 15   | "           |
| Barytes                     | 40   | 40   | 40   | "           |
| Copper powder               | 40   | 40   | 40   | "           |
| Average coefficient of friction | .40 | .42 | .40 | "           |
| Wear HP hrs./cc             | 20.7 | 11.2 | 8.47 | "           |
| Density                     | 3.34 | 3.37 | 3.40 | "           |
| Crossbreaking kg./cm$^2$    | 775  | 770  | 787  | "           |

The above formulation A containing 5% "Kaowool" lends itself to hard wearing disc brake pads of a semi-metallic type, having much lower wear than asbestos-containing pads.

As both fibres, "Kaowool" and asbestos, are very similar in appearance though different in their origin and properties, they can be mixed successfully together in countless different proportions or ratios. By doing so, the health hazard of asbestos can be correspondingly reduced, while on the other hand, the frictional performance of the friction material is greatly improved. An example of such friction material containing a small amount of asbestos as well as "Kaowool" is shown below:

EXAMPLE 3

Phenol Novolac: 12% by weight
"Kaowool": 25% by weight
Asbestos: 10% by weight
Copper powder: 17% by weight
Barytes: 23% by weight
Graphite: 3% by weight
Lead powder: 5% by weight
Antimony trisulphide: 5% by weight The "Kaowool" and asbestos, after being opened up, are mixed together before the resin and the remainder of ingredients are introduced. The mixing process and pressing into pads or linings are carried out along the same lines as in Example 1. Here, the following test results on the scale friction dynamometer were obtained:

Average coefficient of friction: 0.40
Loss in thickness: 0.55 mm

Mixtures of "Kaowool", or rockwool, and asbestos can be in any proportion as desired. This is demonstrated in the following example where the amount of "Kaowool" was kept deliberately low namely 1% by weight.

EXAMPLE 4

|  | A | B | C |  |
|---|---|---|---|---|
| "Kaowool" | 1 | 1 | — | % by weight |
| Rockwool | — | 35 | 1 | " |
| Asbestos | 35 | — | 35 | |
| Phenol Novolac | 15 | 15 | 15 | " |
| Barytes | 24.5 | 24.5 | 24.5 | " |
| Copper Powder | 24.5 | 24.5 | 24.5 | " |
| Average co-efficient of friction | .40 | .50 | .42 | |
| Wear HP hrs./cc | 5.30 | 6.40 | 6.71 | |
| Density g/cc | 2.54 | 2.45 | 2.67 | |
| Crossbreaking kg./cm$^2$ | 647 | 588 | 662 | |

Combinations of ceramic fibre with asbestos are almost unlimited and can be used to suit any particular application.

The friction materials proposed herein can be used as disc brake pads, brake linings, railway brake blocks, clutch linings, and for various industrial applications.

I claim:

1. A friction material wherein the asbestos fibres are substantially completely replaced by blown alumino-silicate ceramic fibres made from the mineral kaolin, said alumino-silicate fibres being substantially free of water glass.

2. Friction material as in claim 1 containing 5 percent to 70 percent by weight of the said blown alumino-silicate fibre.

3. A friction material according to claim 1 characterised by the following composition:
   Phenolic resin 8–25% by weight
   Blown aluminosilicate fibre 5–70% by weight
   Mineral filler 10–40% by weight
   Metallic filler 10–40% by weight
   High Temperature Lubricant 1–15% by weight

* * * * *